Aug. 4, 1931. G. C. RAMSAY 1,817,764

TIRE RIM

Filed July 30, 1929

George Caird Ramsay
INVENTOR
By *Otto Munk*
his Attorney.

Patented Aug. 4, 1931

1,817,764

UNITED STATES PATENT OFFICE

GEORGE CAIRD RAMSAY, OF KINGSWOOD, AUSTRALIA

TIRE RIM

Application filed July 30, 1929, Serial No. 382,104, and in Australia October 5, 1928.

This invention relates to improvements in and connected with partly separable rims for wheels of vehicles, the object of the invention being to provide means wherein a separable part of the rim may be easily and securely attached to the main part of the rim and can likewise be easily removed therefrom, and part of the fastening mechanism of the rim which consists of a dowel and socket device is securely locked together by being embraced by slots in the felly, and incidentally is adapted to serve the purpose of a driver when mounted on the felly of the wheel.

But in order that my invention may be clearly understood I will now describe the same by aid of the accompanying illustrative drawings wherein:—

In each of the illustrations similar letters of reference are used to denote similar or corresponding parts wherever they occur.

Figure 4:
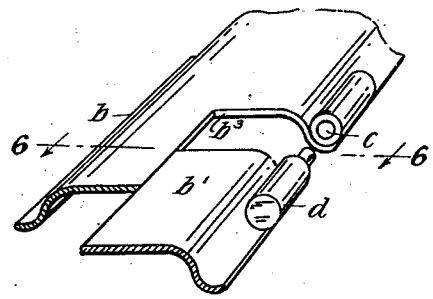
Fig. 4 is a perspective illustration of a dowel and socket device for attaching the abutting ends of the rim members together.
Figure 5:
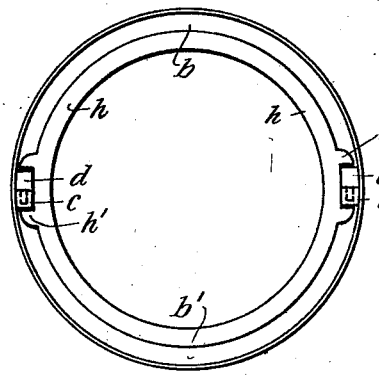
Fig. 5 is an inside elevational view of the rim mounted on a wheel felly, showing the connections between the dowel and socket devices of the rim and one of the felly flanges.

In the drawings (Fig. 1) $a$ is the tire of any convenient design mounted upon the rim $b$, one portion of the rim $b'$ being separable from the main portion, the semi-circumferential cut by which the severance is made being shown at $b2$ more particularly in Fig. 4, and the transverse cut being shown at $b3$ in the same illustration.

The periphery of the main portion is furnished with dowel sockets $c$ which engage dowels $d$ on the severed portion or vice versa, both the dowels and the sockets being securely brazed or otherwise attached to the abutting parts in alignment with each other so that when the tire is properly assembled each dowel readily slides into its corresponding socket. This method of fastening is, in itself, insufficient to guard against lateral movement.

Figure 2:
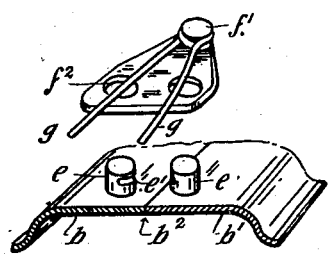
Fig. 2 is a perspective illustration of a fastening device detached from the rim, a portion of the rim being shown in section.

To overcome this deficiency I mount upon either side of the semi-circumferential cut a stud $e$ which projects inwardly towards the centre of the rim, each stud having a slight portion cut or slotted away as indicated at $e'$ in Fig. 2. I also provide a fastening plate $f$ preferably of somewhat triangular form, at the apex of which there is a stud $f'$ round the neck of which the fastening spring $g$ is securely wound.

Figure 1:
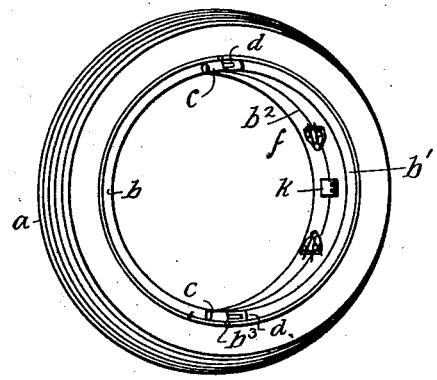
Fig. 1 is a perspective illustration of the rim and tire showing the severed portion of the rim and fastening devices.
Figure 3:
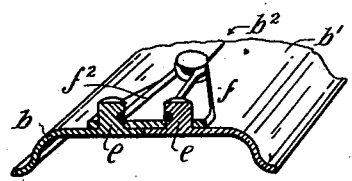
Fig. 3 is a perspective view of a portion of the rim showing the rim and a fastening device in section.
Figure 6:
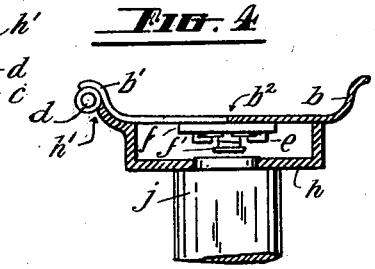
Fig. 6 is a sectional view taken through the transverse split of the rim showing the latter seated on the felly, the section being taken on lines 6—6 of Figure 4.

This spring is of hairpin formation, the legs being adapted to spread outwardly across two holes $f2$ which register with the two studs $e$ on the portions of the rim so that when the separable portion of the rim is engaged at its abutting ends by the dowels previously described the fastening plate is placed across the semi-circumferential cut and mounted upon the studs $e$ and is securely held in position by the legs of the springs which are adapted to be accommodated in the small slots $e'$ as will be well understood upon reference to Figs. 2 and 3 of the drawings as well as to Figs. 1 and 6.

These fastening studs, the fastening plate, and the spring are readily accommodated within the hollow which is formed between the bed of the felly $h$ and the inner surface of the rim and are clear of the projecting ends of the spoke $j$.

For the further security of the severed portion of the rim I form on each side of one flange of the felly and in the vicinity of the dowels and dowel sockets, lugs such as $h'$ between which there is a space of just sufficient width to accommodate each dowel and dowel block. This arrangement provides means for preventing the dowel sockets and blocks from coming apart, and also acts as a driver but in some types of rim and its associated felly in which the flange of the felly presents a wider surface than is shown in the illustration, the lugs or extensions $h'$ may be dispensed with, it being sufficient to cut a slot in the flange of the felly corresponding in width to the space occupied by the dowels and dowel blocks.

The minor section $b'$ is removed when the tire is deflated on the rim by moving that portion of the tire next to the section $b'$ laterally over on the rim until the beads are both at the side of the rim off of the minor section and by then removing the section $b'$ radially in respect to the rim.

Other fastenings and drivers of well known suitable type may also be used if so desired, but in practice it will be found that the spring governed plates and studs, the dowel device and the formation of the slots or spaces in the felly as described will securely hold the separable part of the wheel in position. These parts may be further augmented by a supplemental plate $k$ which is secured to the separable portion of the rim and underlaps the adjacent main portion of the rim as clearly shown in Fig. 1 of the drawings.

What I claim is:—

A tire rim comprising a main part and a separable minor part, the minor part having dowels at its ends and the main part having sockets receiving the dowels, securing means intermediate the dowels comprising a slotted stud on the main part and a slotted stud on the minor part, a plate having apertures therein through which said studs are received, and a spring mounted on the plate by means of a stud thereon, said spring having legs adapted to fit into the slots of the first mentioned studs to prevent withdrawal of said studs from the apertures in said plate.

In testimony whereof I affix my signature.

GEORGE CAIRD RAMSAY.